United States Patent
Meunier et al.

(10) Patent No.: US 7,388,811 B2
(45) Date of Patent: Jun. 17, 2008

(54) METHOD FOR SEPARATING MICROSEISMIC SIGNALS FROM SEISMIC SIGNALS EMITTED BY ONE OR SEVERAL SOURCES

(75) Inventors: Julien Meunier, Paris (FR); Frédéric Huguet, Fosses (FR)

(73) Assignees: Institute Francais du Petrole, Malmaison Cedex (FR); Compagnie Generale de Geophysique, Massy Cedex (FR); Gaz de France, Pairs (FR)

( * ) Notice: Subject to any disclaimer, the term of this patent is extended or adjusted under 35 U.S.C. 154(b) by 147 days.

(21) Appl. No.: 10/530,443

(22) PCT Filed: Oct. 1, 2003

(86) PCT No.: PCT/FR03/02874

§ 371 (c)(1),
(2), (4) Date: Apr. 7, 2005

(87) PCT Pub. No.: WO2004/034090

PCT Pub. Date: Apr. 22, 2004

(65) Prior Publication Data

US 2006/0034153 A1    Feb. 16, 2006

(30) Foreign Application Priority Data

Oct. 8, 2002    (FR) .................... 02 12494

(51) Int. Cl.
*G01V 1/30* (2006.01)
*G01V 1/37* (2006.01)

(52) U.S. Cl. .................... 367/189; 367/37; 367/40; 367/48; 367/49; 181/114

(58) Field of Classification Search .................... 367/37, 367/39, 40–41, 48, 49, 189, 43; 702/17; 181/106, 114

See application file for complete search history.

(56) References Cited

U.S. PATENT DOCUMENTS 4,202,048 A * 5/1980 Edwards .................... 367/40
4,715,020 A * 12/1987 Landrum, Jr. ................ 367/38

(Continued)

FOREIGN PATENT DOCUMENTS

FR    2 805 051    8/2001

*Primary Examiner*—Jack W. Keith
*Assistant Examiner*—Scott A Hughes
(74) *Attorney, Agent, or Firm*—Antonelli, Terry, Stout & Kraus, LLP.

(57) ABSTRACT

This invention is a method of separating induced microseismicity signals from seismic signals acquired within active seismic monitoring operations carried out in underground zones under development which has application for monitoring of underground hydrocarbon or fluid storage reservoirs. Seismic records are formed from signals emitted by one or more seismic sources controlled by orthogonal signals. In this case, the signals are processed to separate the respective contributions of the at least one seismic source to the signals received and to reconstruct the seismograms equivalent to those that would be obtained by actuating the at least one seismic source separately. The induced microseismicity signals (passive seismic signals) are separated from the seismic signals coming from sources (active seismic signals) essentially by isolating the contribution thereof by comparison with a spectral reference model at the fundamental frequencies emitted and at the respective harmonics thereof, and by reconstructing in the time domain the induced microseismicity signals and the signals coming from the at least one seismic source.

10 Claims, 3 Drawing Sheets

U.S. PATENT DOCUMENTS 5,377,104 A    12/1994  Sorrells et al.
5,721,710 A *   2/1998  Sallas et al. ................... 367/41
6,049,508 A     4/2000  Deflandre
6,442,489 B1    8/2002  Gendelman et al.

* cited by examiner

METHOD FOR SEPARATING MICROSEISMIC SIGNALS FROM SEISMIC SIGNALS EMITTED BY ONE OR SEVERAL SOURCES

BACKGROUND OF THE INVENTION

1. Field of the Invention

The invention relates to a method for discriminating microseismic signals induced by the development of an underground reservoir, from among seismic signals emitted within the seismic monitoring operations.

2. Description of the Prior Art

In order to follow the evolution of an underground reservoir under development, it is well-known to permanently install seismic sources and seismic receivers, at the surface or in wells, whether for reservoir exploration or for development wells, and to carry out, at predetermined time intervals, recording of the seismic signals from the formation. These signals may be seismic signals induced by the site development activity or reflected by the geologic discontinuities of the formation in response to the emission of disturbances in the ground by means of one or more seismic sources. Comparison of the recordings performed at different times of the site development provides information on the evolution thereof.

Various long-term seismic monitoring systems are described for example in the following patents EP-591,037 corresponding to U.S. Pat. No. 5,461,594, French Patent 2,593,292 corresponding to U.S. Pat. No. 4,775,009, and French Patent 2,728,973 corresponding to U.S. Pat. No. 5,724,311) or French Patent 2,775,349.

EP Patent 748,457 corresponding to U.S. Pat. No. 5,724, 311 filed by two of the applicants describes a permanent monitoring system allowing obtaining perfect reproducibility of the operating conditions in repetitive seismic monitoring operations carried out in an underground zone traversed by at least one well or borehole, notably in an underground gas storage reservoir. This system comprises, installed on a permanent basis, one or more set(s) of seismic receivers (buried at the surface or placed in one or more wells), several repetitive seismic sources (buried or at the surface), and a permanent linking network for selective energy supply to these sources. A central station remotely controls selectively each one of these sources and records the seismic signals coming from the underground zone in response to the seismic waves transmitted selectively in the ground by the sources.

All these permanently installed sources whose coupling with the surrounding formations remains stable and this supply network, at least partly buried and whose surface coverage area is limited, allows carrying out a series of long-term seismic monitoring operations under stable operating conditions, without any risk of incompatibility with the development site activities.

French Patent 2,775,349 corresponding to U.S. Pat. No. 6,182,012 filed by the same two applicants describes a method and a device intended for permanent monitoring of an underground formation in which cavities are formed for seismic sources (preferably deep enough to be coupled with the formation below the weathered zone (WZ)), at least one well is drilled either below each source or in the immediate vicinity thereof. An antenna having a plurality of seismic receivers (geophones, hydrophone, etc.) is lowered into each well thus drilled and coupled with the surrounding formation. With this device, emission-reception cycles are carried out with emission of seismic waves in the formation by at least one source and acquisition of the signals picked up by the seismic receivers, in response to the waves reflected by the formation. The receivers can for example be associated with a fluid transfer tube lowered in the well in order to connect an underground zone to a surface development device and coupled with the formation surrounding the well.

The various sources of the seismic monitoring device can be actuated successively with a sufficient time interval between the triggering times for reception of the waves reflected by the zone being investigated. It is also possible to use seismic sources emitting the same signals that are triggered simultaneously to increase the power emitted.

French Patent 2,805,051 filed by the applicants describes a method and a system for seismic monitoring of an underground formation. As diagrammatically shown in FIGS. 1 to 4, the system comprises for example a network of seismic antennas 2 each having a series of seismic pickups 4 arranged at regular intervals along a well 3 drilled in the ground. This network can be regular as shown in FIG. 2 or irregular. The pickups are, for example, vertically oriented one-directional or multi-axis (triphones) geophones and/or hydrophones. A seismic source 5 is arranged near to each antenna 2. Piezoelectric type vibrators such as those described in French Patent 2,791,780 U.S. Pat. No. 6,338,394 filed in the joint names of the applicants are advantageously used as sources and permanently installed in the immediate vicinity of each antenna 2. An electronic control and recording module 6 (FIG. 1) can be associated with each antenna. These electronic modules 6 can be connected to a central control and synchronization laboratory 8. According to another implementation mode diagrammatically shown in FIG. 4, antennas 2 are directly connected to a central laboratory 8 including all the individual electronic control and recording modules 6 (FIG. 1).

Seismic waves are emitted in the underground formation by one or more seismic sources (vibrators) 5. In the case of multiple sources, the latter emit simultaneously and are controlled by orthogonal signals so as to form a composite vibrational signal. The vibrators work permanently or at least for a sufficiently long time to obtain a sufficient signal-to-noise ratio. The seismic waves generated by seismic sources 5 are propagated downwards (downgoing waves 9). These incident waves are first recorded by receivers 4 of each well 3. The waves reflected by the discontinuities of the zone (seismic interfaces) are propagated upwards. These upgoing waves 10 are also recorded by the various receivers 4. The upgoing and downgoing waves are thus superimposed in the seismograms. The records are subjected to the conventional processings known in the art suited for those obtained by means of the VSP technique (Vertical Seismic Profiling). Finally, the respective contributions of the seismic sources to the composite vibrational signal are discriminated and the seismograms equivalent to those that would be obtained by actuating the seismic sources separately are reconstructed. Sinusoidal signals of different frequencies, in their fundamental components as well as in their respective harmonics, or signals based on wavelets, Legendre polynomials or random series, etc., are for example used as orthogonal signals.

In the case notably where the orthogonal signals emitted are sinusoids, discrimination of the respective contributions of the seismic sources is for example performed by determining the amplitude and the phase of the composite vibrational signal at the fundamental frequencies of the control signals applied to the seismic sources. This discrimination comprises for example weighting of the signals recorded by a bell weighting (or apodizing) factor and determination of the amplitude and of the phase of the composite signal, or selection by Fourier transform of lines of the complex spectrum associated respectively with the various weighted signals. Reconstruction of the seismograms corresponding specifically to the various seismic sources is carried out for example by applying, after separation thereof, an inverse Fourier transform to the lines associated respectively with the various weighted signals.

Furthermore, it is well-known that reservoir development induces mechanical stress variations in the reservoir and in its overlying bed. These stress variations have the effect of generating seismic signals that are propagated in the formations. The receivers of the various antennas 2 record these signals (upgoing waves 11).

Since seismic sources 5 are arranged much closer to receivers 4 of antennas 2 than to the reservoir and since the energy that is emitted is much more intense than the energy of the induced microseismic signals generated in the reservoir, the microseismic signals are generally concealed and undetectable.

SUMMARY OF THE INVENTION

The method according to the invention allows separation of induced microseismicity signals and multisource seismic signals within the context of monitoring operations in an underground zone under development.

It comprises emission of seismic waves in the formation by coupling therewith one or more seismic sources. In the latter case, these one or more sources emit simultaneously orthogonal signals so as to form a composite vibrational signal, reception of the signals reflected by the formation in response to the emission of seismic waves, recording of the signals received by at least one seismic pickup and processing of the recorded signals so as to separate the respective contributions of the at least one seismic source to the signals received and to reconstruct the seismograms equivalent to those that would be obtained by actuating the seismic sources separately.

The induced microseismicity signals (passive seismic) are separated from the seismic signals emitted essentially by isolating the contribution of each source by comparison with a reference spectral model at the emitted fundamental frequencies and at the respective harmonics thereof, and by reconstructing in the time domain the induced microseismicity signals and the seismic signals emitted.

The spectral contribution of the microseismicity signals to the spectrum of the signals received is obtained for example by subtracting the amplitude and phase values associated with the reference spectral model from the amplitude and the phase of the spectrum associated with the records.

According to an implementation mode, a current model formed by updating a spectral model taking account of the contribution of previous recording cycles is for example used as the reference spectral model.

The current spectral model can be formed by determining a mean value of the frequency spectra formed from (earlier and/or later) records obtained for the same source and the same frequencies.

According to another implementation mode, the current spectral model is formed by determining a median value of the frequency spectra formed from earlier records obtained for the same source and the same frequencies.

According to another implementation mode, the current spectral model is formed by extrapolation or interpolation from the frequency spectrum, from close spectral values.

According to another implementation mode, the current spectral model is formed by using the line obtained at this frequency.

According to an implementation mode, discrimination of induced microseismicity signals from among signals emitted within the context of active seismic monitoring operations is obtained by means of the following stages:

a) for each recording n of a recording cycle p, respective contributions of the various sources at the fundamental frequencies are calculated;

b) a ratio of a contribution to a current spectral model formed by updating a previous spectral model from frequencies emitted during the previous recording and from their harmonics is then calculated;

c) a part of the recording n of cycle p that can be associated with the active seismic monitoring operations is deduced;

d) a part of the recording n of cycle p strictly relevant to the passive microseismic activity is deduced;

e) seismograms that can be associated with the active seismic monitoring operations are formed by inversion in a time domain of respective spectral contributions of each seismic source at the fundamental frequencies and at their harmonics thereof; and f) the underlying microseismic signals contained in the records are formed by inversion in the time domain from the part relevant to the passive microseismic activity.

The spectral contribution is obtained by multiplying a transfer function between a wavelet characteristic of the source and a seismogram associated with a given receiver by a wavelet characteristic of the source. This transfer function can be continuously updated during a current cycle from an estimation made during a previous cycle and from an initial estimation made during the current cycle by the relation.

BRIEF DESCRIPTION OF THE DRAWINGS

Other features and advantages of the method according to the invention will be clear from reading the description hereafter of an embodiment given by way of non limitative example, with reference to the accompanying figures wherein.

DETAILED DESCRIPTION OF THE INVENTION

Figure 1:
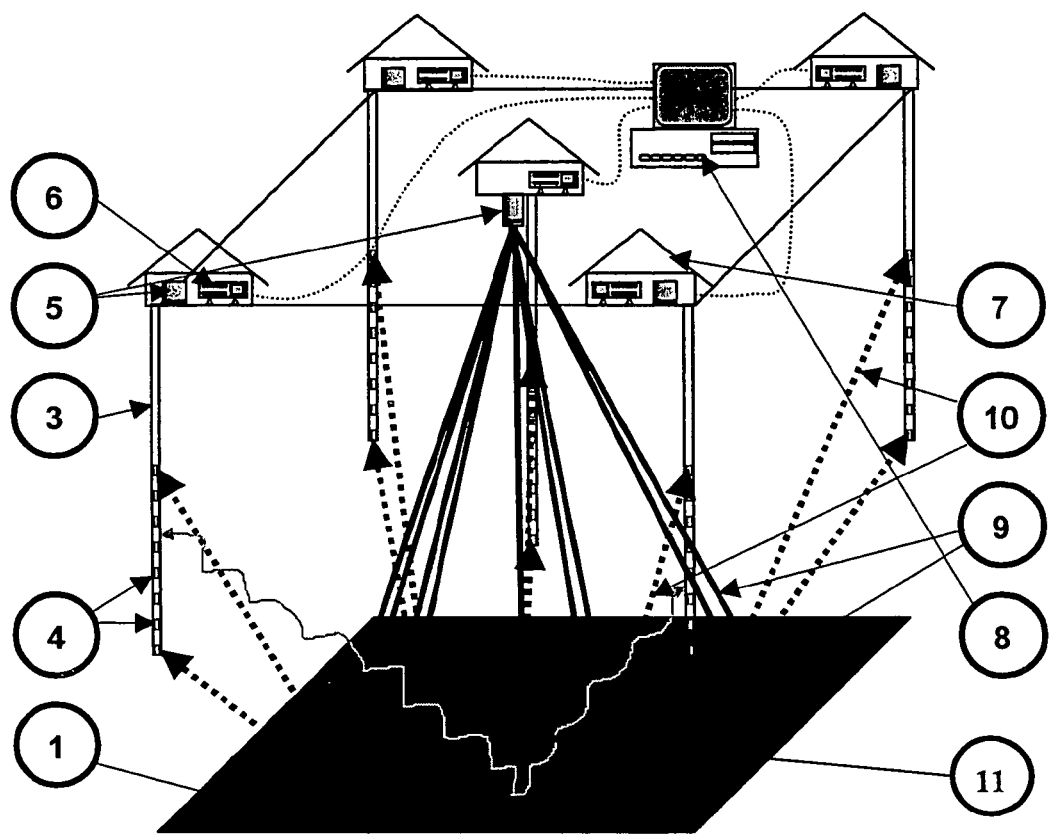
FIG. 1 diagrammatically shows the monitoring device installed in the field for seismic monitoring of an underground formation.
Figure 2:
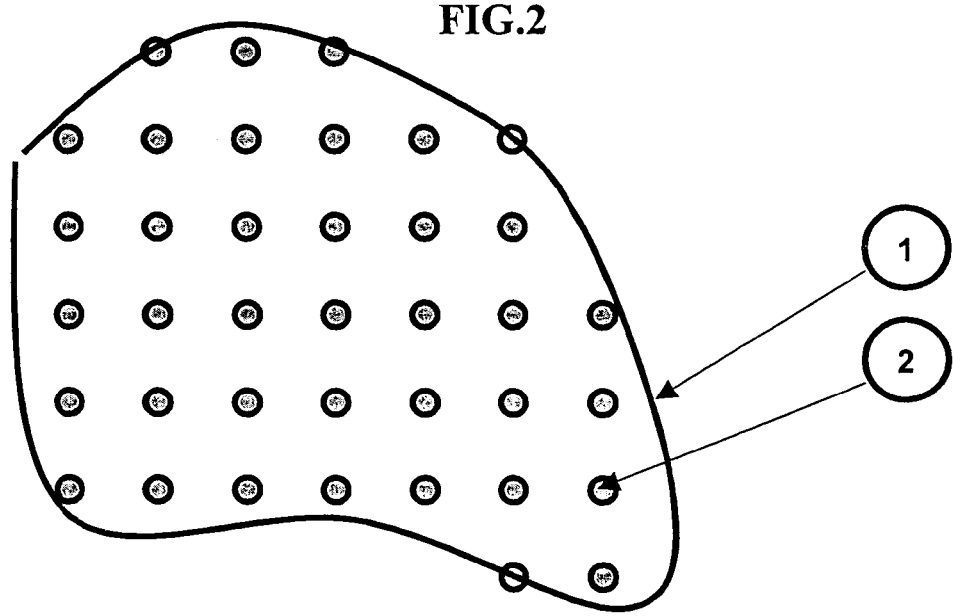
FIG. 2 shows a mode of layout of the emission-reception units in the field.
Figure 3:
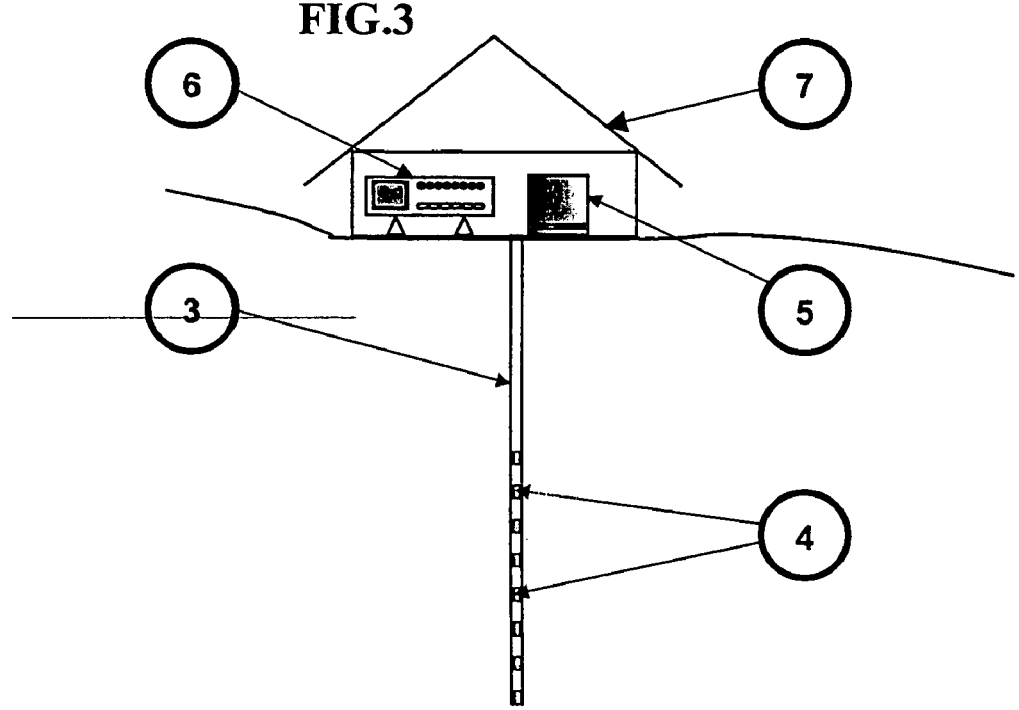
FIG. 3 diagrammatically shows one of these emission-reception units comprising a seismic source and a reception antenna.
Figure 4:
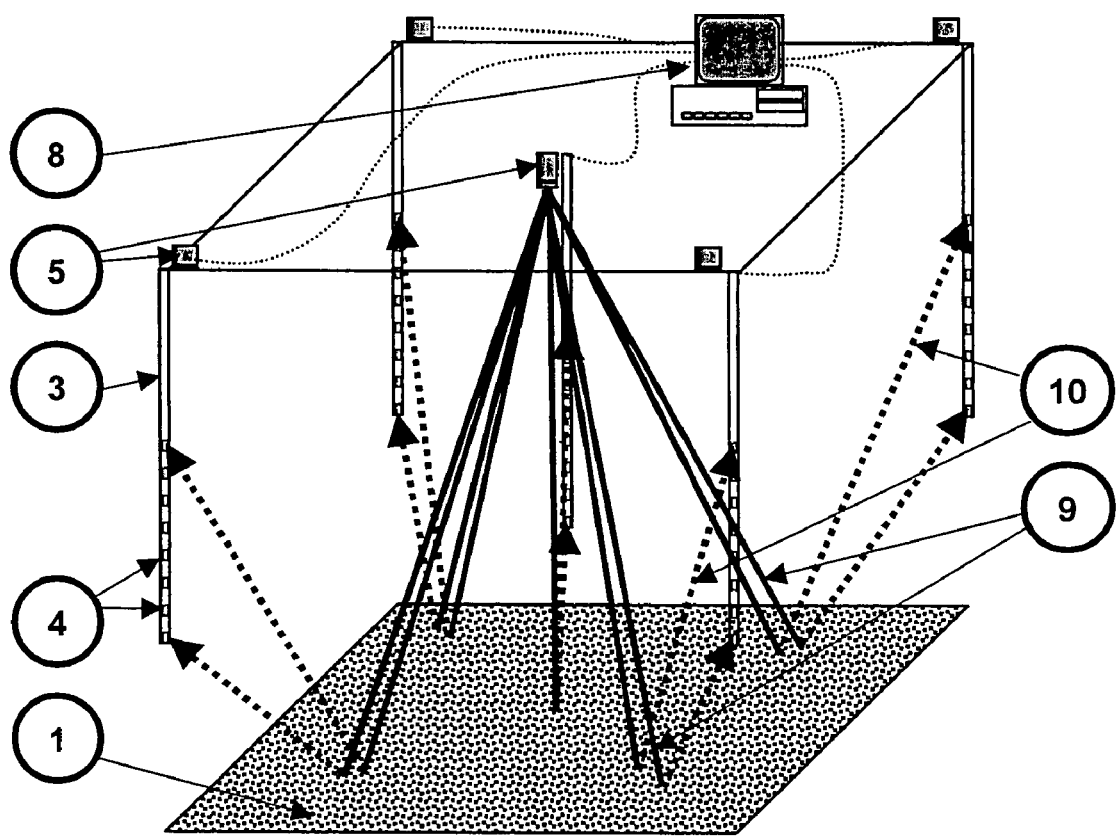
FIG. 4 shows a variant of the monitoring device of FIG. 1.
Figure 5:
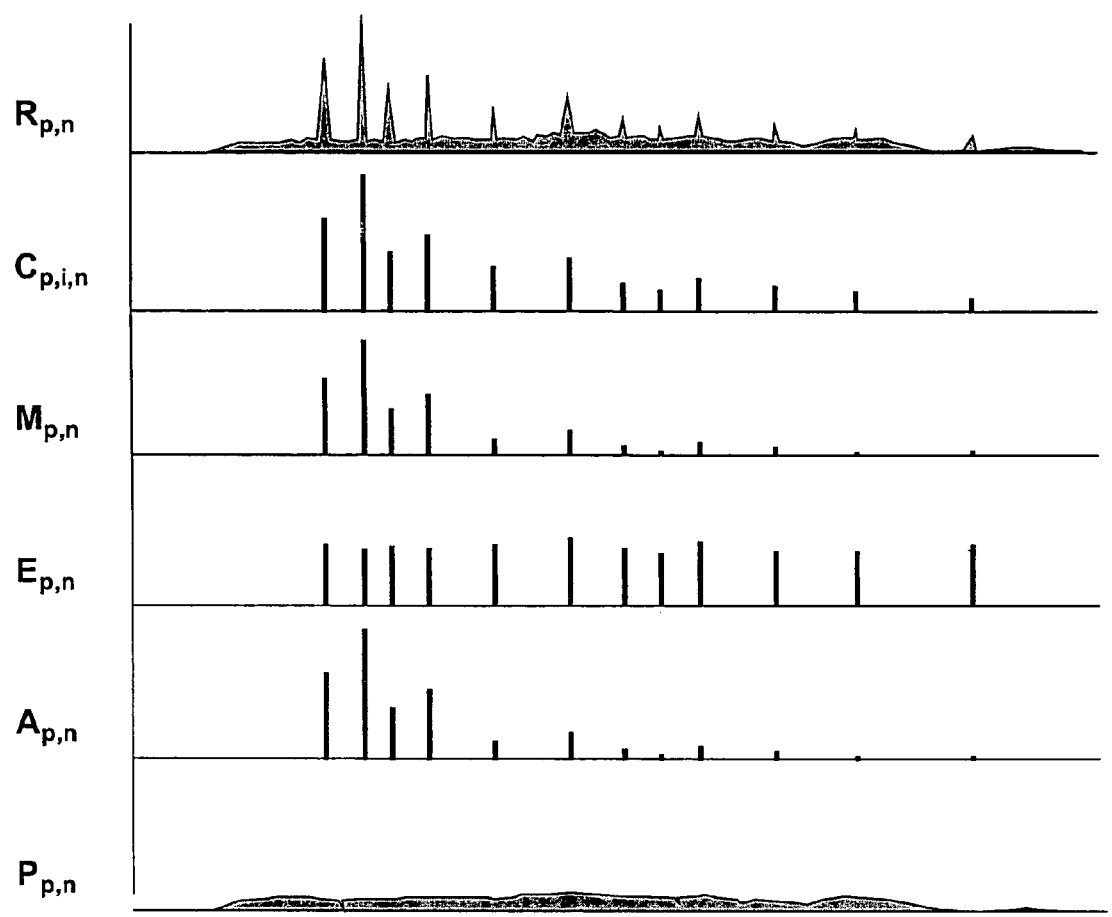
FIG. 5 shows examples of signals and frequency spectra mentioned in the description.

The method of the invention allows carrying out seismic monitoring operations in an underground zone by means of a series of seismic pickups and one or more vibrational seismic sources. If several simultaneous sources are used, they are actuated simultaneously by signals at different frequencies selected so as to allow discrimination of the contributions of each source in the seismograms obtained from the signals received and recorded.

This is generally performed by control of the various sources by sinusoids of different frequencies and by means of known numerical calculation techniques such as using inverse Fourier transform to separate the contributions to the seismograms obtained from the various seismic sources.

Distortion cannot be disregarded with mechanical sources. Simultaneously with a frequency $f_i$, a single source $S_i$ emits frequencies $2f_i$, $3f_i$ ... $nf_i$. Consequently, if $f_i$ and $f_j$ are the respective frequencies of the two sources Si and Sj of the series of sources, we must have $f_i \neq f_j$, as well as $f_i \neq 2f_j$, $f_i \approx 3f_j$, ... $f_i \neq nf_j$ in order to be able to separate their respective contributions.

As already described in the aforementioned French patent-2,805,051, if the composite signal $P_t$ consisting of the sum of N sinusoids $\{f_i, A_i, \Phi_i\}$ with $1 \leq i \leq N$ is emitted, all the frequencies being contained in a spectral band contained between two boundary frequencies $f_b$ and $f_f$, the seismogram $T_t$ observed at point R will have as Fourier transform at the frequency $f_i$, the number of module $A_i$ and of phase $\Phi_i$ equal to the amplitude and to the phase of sinusoid $T_i$. It is thus possible to reconstruct by inverse Fourier transform seismogram $T_t$ by emitting successively all the sinusoids of frequencies $f_b$ to $f_f$.

In the case where, for example, all the amplitudes $A_i$ are 1 and all the phases $\Phi_i$ are zero, the signal $P_t$ obtained is very close to the signal resulting from autocorrelation of a sliding-frequency signal contained in the sweep range $[f_b,f_f]$, commonly used in vibroseismic prospecting. According to the discrete Fourier transform theory well-known in the art, if one wants to listen to source $S_i$ during the time $t_e$, the frequency increment between the sinusoids is $\Delta f = 1/t_e$ and the number of sinusoids necessary is $N_f = (f_f - f_b)t_e$.

N vibrators S1, S2, Si, ... $S_N$ installed in the field can thus be simultaneously excited by means of vibrational signals whose frequencies are such that each source is excited successively by each above sinusoid $N_f$ at any time, on condition that the respective frequencies of the sinusoids emitted at the same time by the various seismic sources are all different from one another. $N_f$ recordings corresponding to the $N_f$ frequencies selected in the sweep range are thus performed with each vibrator. Separation of the signals received by the pickups in the field, in response to the simultaneous emission of the various signals, is thus obtained by selection of the line at the suitable frequency.

Cycles of $N_f$ recordings are thus repeated. The record $E_n$ of a given acquisition cycle contains a set of fundamental and harmonic frequencies which only depends on n. Starting from this observation, the method that will be applied to detect the effects of microseismicity is based on the observation which has proved true in practice according to which the amplitude and phase variations observed at the frequency f and at the time t are very little different from those observed at the frequency $f-\Delta f$ and at the time $t-\Delta t$. This allows forming a cumulative spectral model constructed from records of previous cycles at the same frequencies but formed over a long time during which the characteristics of the seismic signals emitted are likely to vary, and permanently adapted from records obtained during a sufficiently short period for the variations of the signal to be disregarded. The efficiency of method is optimum when the successive frequencies emitted by the same source are regularly incremented. Cycles in upgoing and downgoing frequencies can for example be alternated.

The procedure for showing in practice this spectral contribution of the underlying microseismic signals is as follows.

Notations:

$f_{i,n}$ designates the fundamental frequency emitted by source i during the recording n (this frequency is independent of the cycle), In order to simplify the notations of the following quantities, the subscript giving the number of the receiver is left out. Whatever this number, the quantities are calculated in the same way.

$R_{p,n}$ designates the recording of rank n of cycle p, $C_{p,i,n}$ the contribution of source i to the recording n of cycle p, $M_{p,n}$ the initial model of the active part of the recording n of cycle p. This model contains only the frequencies emitted and their harmonics during recording n, $E_{p,n}$ the ratio between the active contributions of the recording n of cycle p and the initial model of the active part of the recording n of cycle p, $A_{p,n}$ the active part of the recording n of cycle p, $P_{p,n}$ the passive part of the recording n of cycle p (microseismic), k the differences updating coefficient (typically of the order of 15 to 25%), h the models updating coefficient (typically of the order of 5 to 10%).

Considering these notations, the method first consists, for each recording n of cycle p, in calculating the respective contributions $C_{p,i,n}$ of the various sources at their fundamental frequencies and at their harmonics by means of the method described in the aforementioned French patent 2,805,051. Owing to the possible presence of microseismic energy, the contribution of the various sources is likely to be affected by noise.

This estimation can be improved by associating the contributions of all the receivers of a same recording $C_{p,i,n}$. These contributions can be considered to be the product of two factors among which one depends only on the source (and not on the receiver) and the other on the receiver, and not on the source.

If subscript r represents the receiver, $$C_{p,i,n,r} = S_{p,i,n} T_{p,i,n,s}.$$

T only depends on p, i and n by the variation of the characteristics of the receiver and of its environment with time. These variations are very slow and can be disregarded or estimated more precisely.

S and T are determined to within one factor. The average of the downgoing waves can thus be selected for $S_{p,i,n}$. This average is obtained by means of a calculation well-known in VSP processing (flattening of the downgoing waves and average). The $T_{p,i,n,r}$ are then the transfer functions between the downgoing wave and the seismogram.

In cases where the variation of T is to be taken into account, updating coefficient h can for example be used to update $T_{p,i,n,r}$ from $T_{p,i,n,r}$ as follows:

If $Co_{p,i,n,r}$ designates the initial estimation of contribution C and $To_{p,i,n,r}$ that of the receiver factor, S is calculated by flattening and averaging of the downgoing waves, then $To_{p,i,n,r}$ is calculated by the relation:

$$To_{p,i,n,r} = \frac{Co_{p,i,n}}{S_{p,i,n}}$$

The final estimation of the receiver factor is obtained by:

$$T_{p,i,n,r} = (1-h)T_{p,i,n-1,r} + hTo_{p,i,n,r}$$

and the final contribution of source i to cycle p of recording n by:

$$C_{p,i,n,r} = S_{p,i,n} T_{p,i,n,r}.$$

Then the ratio $E_{p,n}$ of the current recording to the spectral model by the relation is calculated:

$$E_{p,n} = (1-k)E_{p,n-1} + k \frac{\sum C_{p,i,n}}{M_{p,n}}.$$

This calculation requires knowledge of $M_{p,n}$ whose calculation described below is carried out during cycle p−1. It comprises smoothing the previous frequencies so as to limit the effect of the microseismic energy in its estimation. The proposed formula only uses the previous records and thus allows real-time conditions. In difficult cases, this sum can be replaced by an average or a current median. Deferred-time conditions are then necessary (the time required to carry out the second half of the recordings used in calculation of the average).

If $M_{p+1,n}$ represents the initial model of the active part of the recording n of cycle p+1, then:

$$M_{p+1,n} = (1-h)M_{p,n} + h\Sigma E_{p,n-1} C_{p,i,n-1}$$

This model essentially weights an average of the current contribution and of the previous contributions. The formula used allows variation of the model: the contribution of cycle p-q to the model used for cycle p is multiplied by coefficient $(1-h)^q$ which tends to zero all the faster as h is close to 1. This allows model $M_{p,n}$ to follow the seasonal variations, and ratios $E_{p,n}$ to reflect only the daily variations. Knowing spectral model $M_{p,n}$ and ratio $E_{p,n}$ of the contribution to the previously established model, part $A_{p,n}$ of the recording n of cycle p relevant to the active seismic part is deduced:

$$A_{p,n} = M_{p,n} E_{p,n}.$$

Similarly, part $P_{p,n}$ of the recording n of cycle p strictly relevant to the (passive) microseismic activity is calculated by the relation:

$$P_{p,n} = R_{p,n} - A_{p,n}.$$

The respective spectral contributions $C_{p,i,n}$ of each source Si at the fundamental frequencies and their harmonics, after completion of a cycle of measurements, provide, by inverse FFT, the seismograms (in the time domain) used within the context of active exploitation.

The estimation of the underlying microseismic activity contained in record $R_{p,n}$ is obtained by inverse FFT from the part $P_{p,n}$ relevant to passive contributions.

Updating of ratio $E_{p,n}$ between the current contribution and the spectral model $M_{p,n}$ is performed in a relatively fast way so as to allow fast variations of the signal. Updating of the initial model is performed in a much slower way; in fact, the initial model might not be updated.

The interest of these updatings is to optimize estimation of the active signal when its variations cannot be controlled (seasonal and daily variations). In the most favourable cases, they are not necessary and estimation of the active part amounts to the initial model.

Another possible simplification disregards the seismic noise at the emitted frequencies (and, if need be, at the harmonics of these frequencies). It no longer takes estimation of the active part and merely cancelling or interpolating the lines corresponding to the frequencies emitted (and, if need be, those of their harmonics) is utilized in order to obtain the passive part.

The harmonic lines of the frequency spectrum of each signal recorded are first suppressed, and the amplitude and the phase are interpolated at the line values at the frequency of the source; the record that has not been assigned by the emissions of the sources possibly containing a microseismic signal is then reconstructed by inversion. This implementation mode is rather suitable in the case of a limited number of sources and/or sources having a high signal variability with time.

The invention claimed is:

1. A method of active seismic monitoring of an underground formation providing separation of induced microseismicity signals from seismic signals emitted during active seismic monitoring of an underground zone under development, the induced microseismicity signals and the seismic signals being obtained only during the active seismic monitoring, comprising carrying out seismic recording cycles with emission of seismic waves in the formation by coupling therewith at least one seismic source, which emits simultaneously orthogonal signals so as to form a composite vibrational signal, receiving signals reflected by the formation in response to the emission of seismic waves, recording the signals received by at least one seismic pickup and processing the recorded signals to separate respective contributions of each seismic source to the received signals and to reconstruct seismograms equivalent to seismograms that would be obtained by separately actuating each seismic source, separating the induced microseismicity signals in the records from seismic signals resulting from active monitoring operations, by isolating a contribution thereof by comparison with a current spectral model, the current spectral model being formed by updating a previous spectral model using a weighted average of current and previous contributions of each seismic source, and by reconstructing the microseismicity signals by inversion in the time domain.

2. A method as claimed in claim 1, wherein a spectral contribution of the microseismicity signals to a spectrum of the received signals received is obtained by subtracting amplitude and phase values associated with the reference spectral model from amplitude and phase values of a spectrum associated with the records.

3. A method as claimed in claim 1, wherein the reference spectral model is a current spectral model formed by updating a previous spectral model by accounting for a spectral contribution of previous recording cycles.

4. A method as claimed in claim 1, wherein a current spectral model is formed by determining a mean value of a frequency spectra formed from earlier and/or later records obtained for a same source and frequencies which are the same.

5. A method as claimed in claim 1, wherein a current spectral model is formed by determining a median value of a frequency spectra formed from earlier records obtained for a same source and frequencies which are the same.

6. A method as claimed in claim 1, wherein a current spectral model is formed by extrapolation or interpolation from a frequency spectrum from spectral values.

7. A method of active seismic monitoring of an underground formation including discrimination of induced microseismicity signals from among signals emitted during active seismic monitoring of an underground zone under development, the induced microseismicity signals and the seismic signals being obtained only during the active seismic monitoring, comprising carrying out seismic recording cycles with emission of seismic waves in a formation by coupling therewith at least one seismic sources which emits simultaneously orthogonal signals so as to form a composite vibrational signal, receiving signals reflected by the formation in response to emission of seismic waves, recording the signals received by a seismic receiver and processing the recorded signals so as to separate respective contributions of the seismic sources to the received signals and to reconstruct seismograms equivalent to seismograms that would be obtained by separately actuating the seismic sources by separately actuating each seismic source, separating the induced microseismicity signals in the records from seismic signals resulting from active monitoring operations, by isolating a contribution thereof by comparison with a current spectral model, the current spectral model being formed by updating previous spectral model using a weighted average of current and previous contributions of each seismic source, the reference spectral model accounting for spectral contributions of each seismic source at emitted fundamental frequencies and at respective harmonics thereof, and by reconstructing the microseismicity signals by inversion in the time domain, comprising:

a) calculating for each recording n of a recording cycle p, respective contributions ($C_{p,i,n}$) of the seismic sources at the fundamental frequencies;

b) calculating a ratio ($E_{p,n}$) of a contribution to a current spectral model ($M_{p,n}$) formed by updating a previous spectral model ($M_{p,n-1}$) from frequencies emitted during a previous recording (n−1) and from harmonics thereof;

c) deducing a part ($A_{p,n}$) of the recording n of cycle p that can be associated with active seismic monitoring operations;

d) deducing a part ($P_{p,n}$) of the recording n of cycle p related to passive microseismic activity;

e) forming by inversion the seismograms that can be associated with active seismic monitoring operations by inversion in a time domain of the respective spectral contributions ($C_{p,i,n}$) of each seismic source at fundamental frequencies and at harmonics thereof, after completion of a measuring cycle; and f) forming underlying microseismic signals contained in the records by inversion in a time domain from a part ($P_{p,n}$) related to passive microseismic activity.

8. A method as claimed in claim 7, wherein the respective contributions ($C_{p,i,n}$) are obtained by multiplying a transfer function ($T_{p,i,n,r}$) between a wavelet characteristic of each seismic source and a seismogram associated with a receiver, by a wavelet characteristic of each seismic source.

9. A method as claimed in claim 8, wherein the transfer function is continuously updated.

10. A method as claimed in claim 9, wherein updating of the transfer function ($T_{p,i,n,r}$) is obtained during a current cycle from an estimation ($T_{p,i,n-1,r}$) made during a previous cycle and from an initial estimation ($To_{p,i,n,r}$) ($To_{p,i,n,r}$) made during a current cycle by the relation $$T_{p,i,n,r} = (1-h)T_{p,i,n-1,r} + hTo_{p,i,n,r}; \text{ and wherein}$$

h is an updating coefficient of the spectral models.

* * * * *